United States Patent [19]

Kindig et al.

[11] 4,289,528
[45] * Sep. 15, 1981

[54] PROCESS FOR BENEFICIATING SULFIDE ORES

[75] Inventors: James K. Kindig, Arvada; Ronald L. Turner, Golden, both of Colo.

[73] Assignee: Hazen Research, Inc., Golden, Colo.

[ * ] Notice: The portion of the term of this patent subsequent to Jun. 3, 1997, has been disclaimed.

[21] Appl. No.: 93,902

[22] Filed: Nov. 13, 1979

Related U.S. Application Data

[63] Continuation-in-part of Ser. No. 921,582, Jul. 3, 1978, abandoned.

[51] Int. Cl.$^3$ .................................................. C22B 1/00
[52] U.S. Cl. ........................................ 75/1 R; 209/8; 209/9; 209/11; 209/127 R; 209/212; 209/214
[58] Field of Search ..................... 75/1 R, 1 T, 21, 28, 75/62, 72, 77, 82, 83, 111, 112; 423/23, 25, 138; 209/8, 9, 11, 212–214, 127 R, 127 A; 427/47, 252–255

[56] References Cited

U.S. PATENT DOCUMENTS

| | | | |
|---|---|---|---|
| 933,717 | 9/1909 | Lockwood et al. | 209/214 |
| 1,053,486 | 2/1913 | Etherington | 75/1 R |
| 2,132,404 | 10/1938 | Dean | 423/25 |
| 2,332,309 | 10/1943 | Drummond | 427/252 |
| 2,612,440 | 9/1952 | Altmann | 75/0.5 |
| 2,944,883 | 7/1960 | Queneau et al. | 75/0.5 |
| 3,220,875 | 11/1965 | Queneau | 427/217 |
| 3,252,791 | 5/1966 | Frysinger et al. | 75/119 |
| 3,323,903 | 6/1967 | O'Neill et al. | 75/0.5 |
| 3,466,167 | 9/1969 | Illis et al. | 75/112 |
| 3,490,899 | 1/1970 | Krivisky et al. | 423/25 |
| 3,669,644 | 6/1972 | Sato | 423/25 |
| 3,671,197 | 6/1972 | Mascro | 75/6 |
| 3,758,293 | 9/1973 | Viviani et al. | 75/6 |
| 3,926,789 | 12/1975 | Shubert | 209/214 |
| 3,938,966 | 2/1976 | Kindig et al. | 44/1 R |
| 4,056,386 | 11/1977 | McEwan et al. | 423/417 |
| 4,098,584 | 7/1978 | Kindig et al. | 44/1 R |
| 4,119,410 | 10/1978 | Kindig et al. | 44/1 R |
| 4,120,665 | 10/1978 | Kindig et al. | 44/1 R |
| 4,187,170 | 2/1980 | Westcott | 209/8 |
| 4,205,979 | 6/1980 | Kindig et al. | 209/214 |

FOREIGN PATENT DOCUMENTS

| | | | |
|---|---|---|---|
| 28375 | 7/1931 | Australia | 75/6 |
| 179095 | 7/1954 | Austria | 75/112 |
| 452790 | 11/1980 | Canada | 75/6 |
| 119156 | 8/1959 | U.S.S.R. | 209/212 |

OTHER PUBLICATIONS

Henderson, J. G. et al., Metallurgical Dictionary, Rheinhold Publishing Corp., N.Y., p. 227, (1953).
Sinclair, J. S., *Coal Preparation and Power Supply at Collieries*, London, pp. 15–17, (1962).

*Primary Examiner*—Michael L. Lewis
*Attorney, Agent, or Firm*—Sheridan, Ross, Fields & McIntosh

[57] ABSTRACT

One or more mineral values of sulfide ores are beneficiated by cotreating the sulfide ore with a metal containing compound and a reducing gas under conditions such as to selectively enhance the magnetic susceptibility of the mineral values to the exclusion of the gangue in order to permit a physical separation between the values and gangue.

57 Claims, No Drawings}

PROCESS FOR BENEFICIATING SULFIDE ORES

CROSS-RELATED PATENT APPLICATIONS

This application is a continuation-in-part application of U.S. Ser. No. 921,582 filed July 3, 1978 now abandoned.

TECHNICAL FIELD

This invention relates to a means for treating ores to separate the mineral value(s) from gangue material by selectively enhancing the magnetic susceptibility of the mineral value(s) so that they may be magnetically removed from the gangue.

BACKGROUND ART

As is well-known, mining operations in the past for recovering various metals, e.g., lead, copper, have utilized high grade ore deposits where possible. Many of these deposits have been exhausted and mining of lower grade ores is increasing. The processing of these leaner ores consumes large amounts of time, labor, reagents, power and water with conventional processing.

In addition to the increased expense associated with the extraction of these metals from low grade ores, proposed processes for separation of certain of the sulfide ores are technically very difficult and involve elaborate and expensive equipment. In many cases the expense incurred by such separation would be greater than the commercial value of the metal, such that the mineral recovery, while theoretically possible, is economically unfeasible.

U.S. Pat. No. 4,098,584 "Removal of Impurities from Coal", Ser. No. 767,659, filed Feb. 10, 1977, discloses the cotreatment of coal with a metal containing compound and a gas selected from the group consisting of hydrogen and carbon monoxide in order to selectively enhance the magnetic susceptibility of various impurities contained within the coal. This process selectively enhances both sulfides and various oxides to the exclusion of coal.

Copending patent application "Process for Beneficiating Ores", Ser. No. 921,582 filed July 3, 1978 discloses a method for beneficiating the mineral values of sulfide ores by contacting the ore mixture with an iron carbonyl in order to selectively enhance the magnetic susceptibility of the mineral values. It has been found that this method of beneficiating mineral values can be significantly improved by cotreating the sulfide ores with an iron containing compound and a reducing gas as hereinafter described.

DISCLOSURE OF THE INVENTION

The process of the present invention entails cotreating a metal sulfide ore mixture with a metal containing compound and a reducing gas under processing conditions such that the magnetic susceptibility of the ore is selectively enhanced to the exclusion of the gangue. The affected ore values may then be magnetically separated from the less magnetic constituents.

BEST MODE FOR CARRYING OUT THE INVENTION

The process of the present invention is particularly useful for concentrating sulfide minerals. The process employs the simultaneous cotreatment of the sulfide ore with a metal containing compound and a reducing gas in order to selectively enhance the magnetic susceptibility of various mineral values contained within the ore. The treated mixture can then be treated by magnetic means to produce a beneficiated product.

"Enhancing the magnetic susceptibility" of the ore as used herein is intended to be defined in accordance with the following discussion. Every compound of any type has a specifically defined magnetic susceptibility, which refers to the overall attraction of the compound to a magnetic force. An alteration of the surface magnetic characteristics will alter the magnetic susceptibility. The metal and gas cotreatment of the inventive process alters the surface characteristics of the ore particles in order to enhance the magnetic susceptibility of the particles. It is to be understood that the magnetic susceptibility of the original particle is not actually changed, but the particle itself is changed, at least at its surface, resulting in a different particle possessing a greater magnetic susceptibility than the original particle. For convenience of discussion, this alteration is termed herein as "enhancing the magnetic susceptibility" of the particle or ore itself.

The sulfide minerals which are capable of undergoing a selective magnetic enhancement in accordance with the process include the metal sulfides of groups VIB, VIIB, VIIIB, IB, IIB, IIIA, IVA and VA. These sulfides preferably specifically include the sulfides of molybdenum, tungsten, manganese, rhenium, iron, ruthenium, osmium, cobalt, rhodium, iridium, nickel, palladium, platinum, copper, gold, silver, zinc, cadmium, mercury, tin, lead, arsenic, antimony and bismuth.

The gangue minerals from which the metal sulfides can be separated include those minerals which do not undergo a sufficient magnetic susceptibility enhancement as a result of the process. These gangue minerals include, for example, silica, alumina, gypsum, muscovite, dolomite, calcite, albite and feldspars, as well as various other minerals. The term gangue as used herein refers to inorganic minerals with which sulfide ores are normally associated. The term does not include coal.

In those ores which contain naturally relatively strongly magnetic constituents, such as magnetite, the magnetic material may first be removed by passing the mixture through a magnetic separator. The nonmagnetic portion obtained by this precleaning step is then subjected to the cotreatment with a metal containing compound and the reducing gas.

Prior to the cotreatment, the ore must be ground to substantially liberate the metal sulfide particles from the gangue particles, if the respective components do not already exist in this liberated state. The ore may be crushed finer than necessary to achieve liberation, but this is not generally economically possible. It is generally satisfactory to crush the ore to minus 14 mesh, although some ores require finer mesh sizes.

Numerous metal containing compounds are capable of enhancing the magnetic susceptibility of the metal sulfides in accordance with the invention. Many iron containing compounds possess the capability of enhancing the magnetic susceptibility of the mineral values of the ore, as long as the compound is adaptable so as to bring the iron in the compound into contact with the mineral value under conditions such as to cause an alteration of at least a portion of the surface of the mineral value.

Iron containing compounds capable of exerting sufficient vapor pressure, with iron as a component in the vapor, so as to bring the iron into contact with the value at the reaction temperature are suitable, as well as other organic and inorganic iron containing compounds which can be dissolved and/or "dusted" and brought into contact with the mineral value contained within the ore. Preferred compounds within the vapor pressure group are those which exert a vapor pressure, with iron as a component in the vapor, of at least about 10 millimeters of mercury, more preferably of at least about 25 millimeters of mercury and most preferably of at least about 50 millimeters of mercury at the reaction temperature. Examples of groupings which fall within this vapor pressure definition include ferrocene and its derivatives and beta-diketone compounds of iron. Specific examples include ferrocene and iron acetylacetonate.

Other organic compounds which may be utilized to enhance the magnetic susceptibility include those which may be homongeneously mixed with a carrier liquid and brought into contact with the components of the ore. Such mixtures include, for example, solutions, suspensions and emulsions. These compounds must be such as to provide sufficient metal to contact the surface of the mineral value. Suitable carrier liquids include, for example, acetone, petroleum ether, naphtha, hexane, benzene and water; but this, of course, is dependent upon the particular metal compound being employed. Specific groupings include, for example, ferrocene and its derivatives and the carboxylic acid salts of iron, such as, iron octoate, iron naphthenate, iron stearate and ferric acetylacetonate.

Additionally, solid organic iron containing compounds capable of being directly mixed with the ore in solid form possess the capability of enhancing the magnetic susceptibility of the metal sulfides. The compound must be in solid form at the mixing temperature and be of sufficiently fine particle size in order to be able to be well dispersed throughout the ore. The particle size is preferably smaller than about 20 mesh, more preferably smaller than about 100 mesh, and most preferably smaller than about 400 mesh. Compounds within this grouping include ferrocene and its derivatives, iron salts of organic acids, and beta-diketone compounds of iron. Specific examples include ferrous formate, 1,1'-diacetyl ferrocene, and 1,1'-dihydroxymethyl ferrocene.

Various inorganic compounds are also capable of producing an enhanced magnetic susceptibility. Preferred inorganic compounds include ferrous chloride, ferric chloride and the metal carbonyls, including, for example, iron, nickel, cobalt, molybdenum, tungsten and chromium carbonyls and derivatives of these compounds. Iron carbonyl is a preferred carbonyl for imparting this magnetic susceptibility, particularly iron pentacarbonyl, iron dodecacarbonyl and iron nonacarbonyl. The more preferred metal containing compounds capable of enhancing the magnetic susceptibility are iron pentacarbonyl, ferrocene and ferric acetylacetonate, with iron pentacarbonyl being the most preferred.

The process is applied by contacting the iron containing compounds with the ore at a temperature wherein the iron containing compound selectively decomposes or otherwise reacts at the surface of the metal sulfide particles to alter their surface characteristics, while remaining essentially unreactive, or much less reactive, at the surface of the gangue particles. The temperature of the reaction is a critical parameter, and dependent primarily upon the particular compound, the cotreating gas and the particular ore. The preferred temperature can be determined by heating a sample of the specific iron containing compound and the specific ore together until the decomposition reaction occurs. Suitable results generally occur over a given temperature range for each system. Generally, temperatures above the range cause non-selective decomposition while temperatures below the range are insufficient for the reaction to occur.

While as indicated above, techniques other than vapor injection methods may be employed as applicable depending upon the metal containing compound being utilized, the following discussion primarily applies to vapor injection techniques, specifically iron pentacarbonyl, as these are generally preferred. Similar considerations, as can be appreciated, apply to the other described techniques.

The preferred temperatures when iron pentacarbonyl is employed as the treating gas are primarily dependent upon the ore being treated and the cotreatment gas being utilized. It is generally preferred to select a temperature which is within a range of 125° C., more preferably 50° C., and most preferably 15° C. less than the general decomposition temperature of the iron carbonyl in the specific system. The general decomposition temperature is intended to mean the temperature at which the iron carbonyl decomposes into iron and carbon monoxide in indiscriminate fashion, causing a magnetic enhancement of the gangue as well as the metal sulfide. The "specific system" is intended to include all components and parameters, other than, of course, temperature, of the precise treatment, as the general decomposition temperature generally varies with different components and/or different parameters. This decomposition temperature range can be readily determined by analytical methods, and often a trial and error approach is preferred to determine the precise temperature range for each specific system.

The amount of the metal containing compound used and the time of treatment can be varied to maximize the selective enhancement treatment. With respect to iron carbonyl the preferred amount employed is from about 0.1 to about 100 kilograms per metric ton of feed, more preferably from about 1 to about 50 kilograms per metric ton of feed, and most preferably from about 2 to 20 kilograms per metric ton of feed. The cotreatment reaction is generally conducted for a period of time of from about 0.05 to about 4 hours, more preferably from about 0.15 to about 2 hours, and most preferably from about 0.25 to about 1 hour.

The particular process of the invention concerns co-treating the ore with a metal containing compound as hereinabove discussed, while simultaneously treating the ore with a reducing gas. Preferred gases include those selected from the group consisting of hydrogen, carbon monoxide, ammonia, and lower hydrocarbons in the range of about $C_1$ to $C_8$, particularly including methane, ethane, ethylene, propane, propylene, butane and butylene, as well as other similar reducing gases. These gases in and of themselves have no appreciable effect upon the magnetic susceptibility of the mineral values; however, they significantly improve the results obtained over the metal containing compound treatments alone.

The metal containing compound and the gas may be introduced into the reaction chamber together or simultaneously from different inlets, as long as the reducing gas is available to the metal containing compound during the treatment.

The type and amount of gas will depend to some extent upon the metal containing compound being used. Generally, the gas will be employed at a concentration of preferably at least about 1 percent, more preferably at least about 10 percent and most preferably about 100 percent of the reactor atmosphere.

After the feed mixture containing the metal sulfide values has been treated with a metal containing compound, it can then be subjected to a physical separation process to effect the separation of the treated sulfides from the gangue. Any of many commercially available magnetic separators can be used to remove these values from the gangue. For example, low or medium intensity separations can be made with a permanent magnetic drum separator, electromagnetic drum separators, induced roll separators or other configurations known to those skilled in the art. Since most sulfides are liberated at a mesh size of 65 mesh or finer, a wet magnetic separation process is more effective. Thus, high intensity, high gradient wet magnetic separators are preferred. Also electrostatic techniques may be employed as the primary separation means, or in addition to the magnetic separation means. The selective change in surface characteristics changes the electrical conductivity of the particle in analogous fashion to changing the particle's magnetic characteristics. Additionally, due to the fact that the sulfide surface characteristics have been altered, the sulfides are often more amenable to processes such as flotation and chemical leaching.

EXAMPLE 1

Samples of 3 percent galena in silica sand matrix, sized to a minus 65 mesh, were subjected to processing as follows. The first sample was merely treated at a temperature of 136° C. for 30 minutes. A second sample was treated exactly the same with the additional treatment of 8 kilograms of iron pentacarbonyl per metric ton of the galena mixture. Additional samples were treated as the second sample, and also were cotreated with various gases as specified in Table 1. Each of these cotreatment samples was heated to 136° C., then the system was purged with the reducing gas for 15 minutes at a flow rate such that one reactor volume of reducing gas was introduced into the system every 4.3 minutes. This was immediately followed by the iron carbonyl treatment. The comparative results are given below in Table 1. The metal analyzed in all cases was lead.

TABLE 1

| $Fe(CO)_5$ Dosage (kg./m. ton) | Cotreatment | Fraction | Weight (%) | Grade (%) | Galena Distribution (%) |
|---|---|---|---|---|---|
| 0 | None | Magnetic | 0.55 | 4.07 | 1.2 |
| | | Nonmagnetic | 99.45 | 1.90 | 98.8 |
| | | Calculated Feed | 100.00 | 1.91 | 100.0 |
| 8 | None | Magnetic | 38.8 | 6.78 | 86.5 |
| | | Nonmagnetic | 61.2 | 0.673 | 13.5 |
| | | Calculated Feed | 100.00 | 3.04 | 100.0 |
| 8 | $H_2$ | Magnetic | 10.4 | 15.2 | 78.6 |
| | | Nonmagnetic | 89.6 | 0.481 | 21.4 |
| | | Calculated Feed | 100.0 | 2.01 | 100.0 |
| 0 | $H_2$ | Magnetic | .60 | 16.0 | 5.3 |
| | | Nonmagnetic | 99.40 | 1.79 | 94.7 |
| | | Calculated Feed | 100.0 | 1.88 | 100.0 |
| 8 | CO | Magnetic | 3.2 | 51.5 | 70.5 |
| | | Nonmagnetic | 96.8 | 0.713 | 29.5 |
| | | Calculated Feed | 100.0 | 2.34 | 100.0 |
| 0 | CO | Magnetic | .56 | 7.41 | 1.7 |
| | | Nonmagnetic | 99.44 | 2.31 | 98.3 |
| | | Calculated Feed | 100.00 | 2.34 | 100.0 |
| 8 | $NH_3$ | Magnetic | 3.8 | 27.3 | 80.0 |
| | | Nonmagnetic | 96.2 | 0.269 | 20.0 |
| | | Calculated Feed | 100.0 | 1.30 | 100.0 |
| 0 | $NH_3$ | Magnetic | 0.47 | 8.31 | 2.0 |
| | | Nonmagnetic | 99.53 | 1.94 | 98.0 |
| | | Calculated Feed | 100.00 | 1.97 | 100.0 |
| 8 | $CH_4$ | Magnetic | 64.0 | 2.98 | 92.1 |
| | | Nonmagnetic | 36.0 | 0.454 | 7.9 |
| | | Calculated Feed | 100.0 | 2.07 | 100.0 |
| 0 | $CH_4$ | Magnetic | 0.48 | 11.3 | 2.7 |
| | | Nonmagnetic | 99.52 | 1.97 | 97.3 |
| | | Calculated Feed | 100.00 | 2.01 | 100.0 |
| 8 | $C_2H_4$ | Magnetic | 42.4 | 4.3 | 91.3 |
| | | Nonmagnetic | 57.6 | 0.303 | 8.7 |
| | | Calculated Feed | 100.0 | 2.00 | 100.0 |
| 0 | $C_2H_4$ | Magnetic | 0.59 | 12.2 | 3.3 |
| | | Nonmagnetic | 99.41 | 2.13 | 96.7 |
| | | Calculated Feed | 100.00 | 2.19 | 100.0 |

EXAMPLE 2

Samples of 3 percent sphalerite mixed in a silica matrix were heated to 132° C. for 30 minutes. All of the samples which were treated with iron carbonyl were treated for 30 minutes with the carbonyl at a rate of 8 kilograms iron carbonyl per metric ton of ore. Again, for the samples which were cotreated with a gas, the sample was heated to 132° C. and then the system was purged with the gas for 15 minutes at a flow rate such that one reactor volume of reducing gas is introduced into the system every 4.3 minutes. This was immediately followed by the iron carbonyl treatment. The results of the analyses for zinc are presented below in Table 2.

TABLE 2

| Fe(CO)$_5$ Dosage (kg./m. ton) | Co-treatment | Weight Fraction | Grade (%) | Distribution (%) | Sphalerite (%) |
|---|---|---|---|---|---|
| 0 | None | Magnetic | 0.15 | 3.26 | 0.3 |
| | | Nonmagnetic | 99.85 | 1.54 | 99.7 |
| | | Calculated Feed | 100.00 | 1.54 | 100.0 |
| 8 | None | Magnetic | 8.4 | 11.5 | 56.7 |
| | | Nonmagnetic | 91.6 | 0.804 | 43.3 |
| | | Calculated Feed | 100.0 | 1.70 | 100.0 |
| 8 | H$_2$ | Magnetic | 1.8 | 45.3 | 39.9 |
| | | Nonmagnetic | 98.2 | 1.25 | 60.1 |
| | | Calculated Feed | 100.0 | 2.04 | 100.0 |
| 0 | H$_2$ | Magnetic | .48 | 11.1 | 3.6 |
| | | Nonmagnetic | 99.52 | 1.33 | 96.4 |
| | | Calculated Feed | 100.00 | 1.37 | 100.0 |
| 8 | CO | Magnetic | 0.24 | 13.8 | 2.1 |
| | | Nonmagnetic | 99.76 | 1.58 | 97.9 |
| | | Calculated Feed | 100.00 | 1.61 | 100.0 |
| 0 | CO | Magnetic | .42 | 9.29 | 2.6 |
| | | Nonmagnetic | 99.58 | 1.52 | 97.4 |
| | | Calculated Feed | 100.00 | 1.55 | 100.0 |
| 8 | NH$_3$ | Magnetic | 4.6 | 35.2 | 81.2 |
| | | Nonmagnetic | 95.4 | 0.394 | 18.8 |
| | | Calculated Feed | 100.0 | 2.00 | 100.0 |
| 0 | NH$_3$ | Magnetic | 0.44 | 9.78 | 2.5 |
| | | Nonmagnetic | 99.56 | 1.66 | 97.5 |
| | | Calculated Feed | 100.00 | 1.70 | 100.0 |
| 8 | C$_2$H$_4$ | Magnetic | 17.4 | 6.74 | 71.6 |
| | | Nonmagnetic | 82.6 | 0.562 | 28.4 |
| | | Calculated Feed | 100.0 | 1.64 | 100.0 |
| 0 | C$_2$H$_4$ | Magnetic | 0.42 | 7.57 | 2.0 |
| | | Nonmagnetic | 99.58 | 1.55 | 98.0 |
| | | Calculated Feed | 100.00 | 1.58 | 100.0 |

EXAMPLE 3

Samples of 5 percent molybdenite mixed with a silica matrix were heated to 130° C. and subjected to various treatments as described in Example 2. The results of analyses for molybdenum are shown below in Table 3.

TABLE 3

| Fe(CO)$_5$ Dosage (kg./m. ton) | Cotreatment | Fraction | Weight (%) | Grade (%) | Molybdenite Distribution (%) |
|---|---|---|---|---|---|
| 0 | None | Magnetic | 0.57 | 4.32 | 18.9 |
| | | Nonmagnetic | 99.43 | 0.106 | 81.1 |
| | | Calculated Feed | 100.00 | 0.130 | 100.0 |
| 8 | None | Magnetic | 14.0 | 1.08 | 92.1 |
| | | Nonmagnetic | 86.0 | 0.015 | 7.9 |
| | | Calculated Feed | 100.0 | 0.164 | 100.0 |
| 8 | H$_2$ | Magnetic | 5.4 | 2.12 | 77.0 |
| | | Nonmagnetic | 94.6 | 0.036 | 23.0 |
| | | Calculated Feed | 100.0 | 0.148 | 100.0 |
| 0 | H$_2$ | Magnetic | .61 | 2.63 | 11.9 |
| | | Nonmagnetic | 99.39 | 0.120 | 88.1 |
| | | Calculated Feed | 100.00 | 0.14 | 100.0 |
| 8 | CO | Magnetic | 1.1 | 10.58 | 71.5 |
| | | Nonmagnetic | 98.9 | 0.047 | 28.5 |
| | | Calculated Feed | 100.0 | 0.162 | 100.0 |
| 0 | CO | Magnetic | .61 | 3.40 | 13.3 |
| | | Nonmagnetic | 99.39 | 0.136 | 86.7 |
| | | Calculated Feed | 100.00 | 0.16 | 100.0 |
| 8 | NH$_3$ | Magnetic | 2.1 | 8.51 | 89.2 |
| | | Nonmagnetic | 97.9 | 0.022 | 10.8 |
| | | Calculated Feed | 100.0 | 0.201 | 100.0 |
| 0 | NH$_3$ | Magnetic | 0.72 | 3.09 | 18.2 |
| | | Nonmagnetic | 99.28 | 0.101 | 81.8 |
| | | Calculated Feed | 100.00 | 0.122 | 100.0 |
| 8 | CH$_4$ | Magnetic | 4.6 | 3.88 | 94.0 |
| | | Nonmagnetic | 95.4 | 0.012 | 6.0 |
| | | Calculated Feed | 100.0 | 0.189 | 100.0 |
| 0 | CH$_4$ | Magnetic | 0.60 | 3.74 | 16.0 |
| | | Nonmagnetic | 99.40 | 0.119 | 84.0 |
| | | Calculated Feed | 100.00 | 0.141 | 100.0 |
| 8 | C$_2$H$_4$ | Magnetic | 7.3 | 2.45 | 94.6 |
| | | Nonmagnetic | 92.7 | 0.011 | 5.4 |
| | | Calculated Feed | 100.0 | 0.189 | 100.0 |
| 0 | C$_2$H$_4$ | Magnetic | 0.55 | 3.53 | 14.2 |
| | | Nonmagnetic | 99.45 | 0.118 | 85.8 |

TABLE 3-continued

| Fe(CO)$_5$ Dosage (kg./m. ton) | Cotreatment | Fraction | Weight (%) | Grade (%) | Molybdenite Distribution (%) |
|---|---|---|---|---|---|
| | | Calculated Feed | 100.00 | 0.136 | 100.0 |

EXAMPLE 4

Samples of 3 percent galena mixed in a silica matrix were cotreated with ferrocene and hydrogen and also ferrocene with carbon monoxide. The galena was also treated alone with each of the gases for comparative purposes. These processes were carried out at a temperature of 400° C. and the cotreatment was carried out as in a previous example with the ferrocene being applied through a solvent deposition. Additionally, samples of 3 percent galena were cotreated with ferric acetylacetonate and hydrogen gas, and additional samples were treated with ferric acetylacetonate and carbon monoxide. Comparative data were also obtained by treating the galena in accordance with the same procedure with the omission of the ferric acetylacetonate. All of these tests were made at 270° C. Again, for the cotreatments, the system was purged with the designated cotreatment gas before adding the ferric acetylacetonate as a vapor. The comparative results are presented below in Table 4.

TABLE 4

| Compound | Dosage (kg/m ton) | Gas | Fraction | Weight (%) | Grade (%) | Galena Distr. (%) |
|---|---|---|---|---|---|---|
| Ferrocene | 0 | None | Magnetic | 0.48 | 10.2 | 2.4 |
| | | | Nonmagnetic | 99.52 | 1.99 | 97.6 |
| | | | Calculated Feed | 100.00 | 2.03 | 100.0 |
| Ferrocene | 16 | None | Magnetic | 5.1 | 9.73 | 22.7 |
| | | | Nonmagnetic | 94.9 | 1.79 | 77.3 |
| | | | Calculated Feed | 100.0 | 2.20 | 100.0 |
| Ferrocene | 16 | H$_2$ | Magnetic | 2.1 | 24.4 | 22.9 |
| | | | Nonmagnetic | 97.9 | 1.76 | 77.1 |
| | | | Calculated Feed | 100.0 | 2.24 | 100.0 |
| Ferrocene | 0 | H$_2$ | Magnetic | 1.21 | 15.9 | 9.3 |
| | | | Nonmagnetic | 98.79 | 1.90 | 90.7 |
| | | | Calculated Feed | 100.00 | 2.07 | 100.0 |
| Ferrocene | 16 | H$_2$ | Magnetic | 2.8 | 27.6 | 44.0 |
| | | | Nonmagnetic | 96.2 | 1.01 | 56.0 |
| | | | Calculated Feed | 100.0 | 1.75 | 100.0 |
| Ferrocene | 0 | H$_2$ | Magnetic | 0.80 | 10.3 | 3.6 |
| | | | Nonmagnetic | 99.2 | 2.23 | 96.4 |
| | | | Calculated Feed | 100.0 | 2.29 | 100.0 |
| Ferrocene | 16 | CO | Magnetic | 1.41 | 37.1 | 22.3 |
| | | | Nonmagnetic | 98.59 | 1.85 | 77.7 |
| | | | Calculated Feed | 100.00 | 2.35 | 100.0 |
| Ferrocene | 0 | CO | Magnetic | 0.88 | 8.35 | 3.6 |
| | | | Nonmagnetic | 99.12 | 1.97 | 96.4 |
| | | | Calculated Feed | 100.00 | 2.03 | 100.0 |
| Ferric Acetylacetonate | 0 | None | Magnetic | 0.52 | 6.93 | 1.9 |
| | | | Nonmagnetic | 99.48 | 1.86 | 98.1 |
| | | | Calculated Feed | 100.00 | 1.89 | 100.0 |
| Ferric Acetylacetonate | 16 | None | Magnetic | 4.5 | 4.11 | 9.4 |
| | | | Nonmagnetic | 95.5 | 1.86 | 90.6 |
| | | | Calculated Feed | 100.0 | 1.96 | 100.0 |
| Ferric Acetylacetonate | 16 | H$_2$ | Magnetic | 5.5 | 4.61 | 13.4 |
| | | | Nonmagnetic | 94.5 | 1.74 | 86.6 |
| | | | Calculated Feed | 100.0 | 1.90 | 100.0 |
| Ferric Acetylacetonate | 0 | H$_2$ | Magnetic | 0.47 | 8.38 | 1.8 |
| | | | Nonmagnetic | 99.53 | 2.16 | 98.2 |
| | | | Calculated Feed | 100.00 | 2.19 | 100.0 |
| Ferric Acetylacetonate | 16 | CO | Magnetic | 3.8 | 4.25 | 7.7 |
| | | | Nonmagnetic | 96.2 | 2.01 | 92.3 |
| | | | Calculated Feed | | 2.09 | 100.0 |
| Ferric Acetylacetonate | 0 | CO | Magnetic | 0.60 | 11.4 | 3.5 |
| | | | Nonmagnetic | 99.40 | 1.92 | 96.5 |
| | | | Calculated Feed | 100.00 | 1.98 | 100.0 |

EXAMPLE 5

Samples of 3 percent sphalerite mixed in a silica matrix were cotreated with ferric acetylacetonate and hydrogen gas and additional samples were treated with ferrocene and hydrogen gas as described in Example 4. Comparative data were obtained by treating the sphalerite in accordance with the same procedure but with the omission of ferric acetylacetonate and ferrocene, respectively. Table 5 gives the comparative results.

TABLE 5

| Iron Compound | Dosage (kg/m ton) | Gas | Product | Weight (%) | Grade (%) | Sphalerite Distr. (%) |
|---|---|---|---|---|---|---|
| Ferric | 0 | None | Magnetic | 0.54 | 10.2 | 3.1 |

TABLE 5-continued

| Iron Compound | Dosage (kg/m ton) | Gas | Product | Weight (%) | Grade (%) | Sphalerite Distr. (%) |
|---|---|---|---|---|---|---|
| Acetylacetonate | | | Nonmagnetic | 99.46 | 1.72 | 96.9 |
| | | | Calculated Feed | 100.00 | 1.77 | 100.0 |
| Ferric Acetylacetonate | 16 | None | Magnetic | 5.1 | 5.63 | 16.8 |
| | | | Nonmagnetic | 94.9 | 1.52 | 83.2 |
| | | | Calculated Feed | 100.0 | 1.73 | 100.0 |
| Ferric Acetylacetonate | 16 | $H_2$ | Magnetic | 7.3 | 4.72 | 22.0 |
| | | | Nonmagnetic | 92.7 | 1.32 | 78.0 |
| | | | Calculated Feed | 100.0 | 1.57 | 100.0 |
| Ferric Acetylacetonate | 0 | $H_2$ | Magnetic | 0.45 | 8.62 | 2.4 |
| | | | Nonmagnetic | 99.55 | 1.59 | 97.6 |
| | | | Calculated Feed | 100.00 | 1.62 | 100.0 |
| Ferrocene | 0 | None | Magnetic | 0.49 | 6.19 | 1.8 |
| | | | Nonmagnetic | 99.51 | 1.63 | 98.2 |
| | | | Calculated Feed | 100.00 | 1.65 | 100.0 |
| Ferrocene | 16 | None | Magnetic | 4.1 | 8.59 | 21.5 |
| | | | Nonmagnetic | 95.9 | 1.34 | 78.5 |
| | | | Calculated Feed | 100.0 | 1.63 | 100.0 |
| Ferrocene | 16 | $H_2$ | Magnetic | 0.76 | 13.8 | 6.0 |
| | | | Nonmagnetic | 99.24 | 1.65 | 94.0 |
| | | | Calculated Feed | 100.00 | 1.74 | 100.0 |
| Ferrocene | 0 | $H_2$ | Magnetic | 0.85 | 12.9 | 6.0 |
| | | | Nonmagnetic | 99.15 | 1.72 | 94.0 |
| | | | Calculated Feed | 100.00 | 1.82 | 100.0 |

EXAMPLE 6

Samples of 5 percent molybdenite mixed in a silica matrix were cotreated with ferric acetylacetonate and hydrogen gas and also with ferrocene and hydrogen gas as described in Example 4. Comparative data were obtained by treating the molybdenite in accordance with the same procedure but with the omission of ferric acetylacetonate and ferrocene, respectively. Table 6 gives the comparative results.

TABLE 6

| Iron Compound | Dosage (kg/m ton) | Gas | Product | Weight (%) | Grade (%) | Molybdenite Distr. (%) |
|---|---|---|---|---|---|---|
| Ferric Acetylacetonate | 0 | None | Magnetic | 0.55 | 1.04 | 4.1 |
| | | | Nonmagnetic | 99.45 | 0.136 | 95.9 |
| | | | Calculated Feed | 100.00 | 0.141 | 100.0 |
| Ferric Acetylacetonate | 16 | None | Magnetic | 4.3 | 0.801 | 20.8 |
| | | | Nonmagnetic | 95.7 | 0.137 | 79.2 |
| | | | Calculated Feed | 100.0 | 0.166 | 100.0 |
| Ferric Acetylacetonate | 16 | $H_2$ | Magnetic | 3.0 | 1.58 | 30.6 |
| | | | Nonmagnetic | 97.0 | 0.111 | 69.4 |
| | | | Calculated Feed | 100.0 | 0.155 | 100.0 |
| Ferric Acetylacetonate | 0 | $H_2$ | Magnetic | 0.51 | 1.07 | 3.5 |
| | | | Nonmagnetic | 99.49 | 0.150 | 96.5 |
| | | | Calculated Feed | 100.00 | 0.155 | 100.0 |
| Ferrocene | 0 | None | Magnetic | 0.68 | 0.961 | 4.4 |
| | | | Nonmagnetic | 99.32 | 0.143 | 95.6 |
| | | | Calculated Feed | 100.00 | 0.148 | 100.0 |
| Ferrocene | 16 | None | Magnetic | 11.8 | 0.953 | 68.1 |
| | | | Nonmagnetic | 82.2 | 0.064 | 31.9 |
| | | | Calculated Feed | 100.0 | 0.165 | 100.0 |
| Ferrocene | 16 | $H_2$ | Magnetic | 1.5 | 6.67 | 58.9 |
| | | | Nonmagnetic | 98.5 | 0.071 | 41.1 |
| | | | Calculated Feed | 100.0 | 0.170 | 100.0 |
| Ferrocene | 0 | $H_2$ | Magnetic | 0.90 | 0.900 | 5.5 |
| | | | Nonmagnetic | 99.10 | 0.140 | 94.5 |
| | | | Calculated Feed | 100.00 | 0.147 | 100.0 |

EXAMPLE 7

Samples of 3 percent galena in silica sand, sized to minus 65 mesh, were treated with 16 kilograms of ferrous chloride per metric ton of ore and hydrogen gas and with 16 kilograms of ferric chloride per metric ton of ore and hydrogen gas and were heated over a 60 minute time period to 375° C. Prior to the heating of each of these cotreatment samples, the system was purged with the hydrogen gas for 15 minutes at a flow rate such as one reactor volume of gas was introduced into this system every 4.3 minutes. Comparative results were obtained by treating another set of samples exactly the same with the omission of ferrous chloride and ferric chloride. All of the samples were subjected to a magnetic separation process and the results are presented below in Table 7.

TABLE 7

| Iron Compound | Gas | Product | Weight (%) | Grade (%) | Galena Distribution (%) |
|---|---|---|---|---|---|
| $FeCl_2$ | $H_2$ | Magnetic | 1.22 | 20.2 | 15.2 |
| | | Nonmagnetic | 98.78 | 1.39 | 84.4 |
| | | Calculated Feed | 100.0 | 1.62 | 100.0 |
| $FeCl_3$ | $H_2$ | Magnetic | 2.11 | 38.8 | 67.3 |
| | | Nonmagnetic | 97.89 | 0.407 | 32.7 |

TABLE 7-continued

| Iron Compound | Gas | Product | Weight (%) | Grade (%) | Galena Distribution (%) |
|---|---|---|---|---|---|
| | | Calculated Feed | 100.0 | 1.22 | 100.0 |
| None | $H_2$ | Magnetic | 0.73 | 10.1 | 4.1 |
| | | Nonmagnetic | 99.27 | 1.76 | 95.9 |
| | | Calculated Feed | 100.0 | 1.82 | 100.0 |

EXAMPLE 8

Samples of different minerals were ground to minus 65 mesh and mixed with minus 65 mesh silica sand to produce 3 percent synthetic ores. Each sample was treated for 30 minutes with 8 kilograms of iron carbonyl per metric ton of feed. The temperature of the treatment varied for the different minerals and is given below as are the data relating to the wet magnetic recovery of the metals.

TABLE 8

| Mineral | Temp. °C. | Fraction | Yield Wt. (%) | Metal Grade (%) | Metal | Sulfide Distribution (%) |
|---|---|---|---|---|---|---|
| Bornite | 140 | Magnetic | 3.6 | 29.7 | Cu | 78.0 |
| | | Nonmagnetic | 96.4 | 0.313 | Cu | 22.0 |
| | | Calculated Feed | 100.0 | 1.37 | Cu | 100.0 |
| Cinnabar | 190 | Magnetic | 1.6 | 48.1 | Hg | 43.9 |
| | | Nonmagnetic | 98.4 | 1.0 | Hg | 56.1 |
| | | Calculated Feed | 100.0 | 1.75 | Hg | 100.0 |
| Arsenopyrite | 125 | Mangetic | 7.4 | 1.01 | As | 31.0 |
| | | Nonmagnetic | 92.6 | 0.18 | As | 69.0 |
| | | Calculated Feed | 100.0 | 0.24 | As | 100.0 |
| Smaltite | 115 | Magnetic | 1.2 | 5.37 | Co | 22.1 |
| | | Nonmagnetic | 98.8 | 0.23 | Co | 77.9 |
| | | Calculated Feed | 100.0 | 0.29 | Co | 100.0 |
| Smaltite | 115 | Magnetic | 1.2 | 3.35 | Ni | 22.5 |
| | | Nonmagnetic | 98.8 | 0.14 | Ni | 77.5 |
| | | Calculated Feed | 100.0 | 0.18 | Ni | 100.0 |
| Chalcocite | 140 | Magnetic | 3.4 | 50.8 | Cu | 90.5 |
| | | Nonmagnetic | 96.6 | 0.188 | Cu | 9.5 |
| | | Calculated Feed | 100.0 | 1.91 | Cu | 100.0 |
| Chalcopyrite | 140 | Magnetic | 1.8 | 20.5 | Cu | 48.4 |
| | | Nonmagnetic | 98.2 | 0.401 | Cu | 51.6 |
| | | Calculated Feed | 100.0 | 0.76 | Cu | 100.0 |
| Orpiment | 110 | Magnetic | 20.1 | 2.0 | As | 40.5 |
| | | Nonmagnetic | 79.9 | 0.74 | As | 59.5 |
| | | Calculated Feed | 100.0 | 0.99 | As | 100.0 |
| Realgar | 95 | Magnetic | 23.2 | 2.02 | As | 36.5 |
| | | Nonmagnetic | 76.8 | 1.06 | As | 63.5 |
| | | Calculated Feed | 100.0 | 1.28 | As | 100.0 |
| Pentlandite in Pyrrhotite | 105 | Magnetic | 18.2 | 0.733 | Ni | 92.1 |
| | | Nonmagnetic | 81.8 | 0.079 | Ni | 7.9 |
| | | Calculated Feed | 100.0 | 0.145 | Ni | 100.0 |
| Stibnite | 85 | Magnetic | 7.6 | 4.82 | Sb | 48.0 |
| | | Nonmagnetic | 92.4 | 0.43 | Sb | 52.0 |
| | | Calculated Feed | 100.0 | 0.76 | Sb | 100.0 |
| Stibnite | 85 | Magnetic | 8.1 | 3.56 | Sb | 63.4 |
| | | Nonmagnetic | 91.9 | 0.181 | Sb | 36.6 |
| | | Calculated Feed | 100.0 | 0.454 | Sb | 100.0 |
| Tetrahedrite | 117 | Magnetic | 2.9 | 4.43 | Cu | 68.8 |
| | | Nonmagnetic | 97.1 | 0.06 | Cu | 31.2 |
| | | Calculated Feed | 100.0 | 0.19 | Cu | 100.0 |
| Tetrahedrite | 117 | Magnetic | 2.9 | 0.256 | Zn | 31.0 |
| | | Nonmagnetic | 97.1 | 0.017 | Zn | 69.0 |
| | | Calculated Feed | 100.0 | 0.024 | Zn | 100.0 |
| Tetrahedrite | 117 | Magnetic | 2.9 | 0.78 | Ag | 85.3 |
| | | Nonmagnetic | 97.1 | 0.004 | Ag | 14.7 |
| | | Calculated Feed | 100.0 | 0.027 | Ag | 100.0 |
| Tetrahedrite | 117 | Magnetic | 2.9 | 2.34 | Sb | 53.4 |
| | | Nonmagnetic | 97.1 | 0.061 | Sb | 46.6 |
| | | Calculated Feed | 100.0 | 0.127 | Sb | 100.0 |

What is claimed is:

1. In a process for the beneficiation of a sulfide ore from the gangue, excluding coal, wherein the ore is treated with a metal containing compound under conditions which cause the metal containing compound to react substantially at the surface of the metal sulfide particles to the substantial exclusion of the gangue particles so as to alter the surface characteristics of the metal sulfide values thereby causing a selective enhancement of the magnetic susceptibility of one or more metal sulfide values of the ore to the exclusion of the gangue in order to permit a physical separation between the metal sulfide values and the gangue, the improvement comprising:

cotreating the ore with a reducing gas during the metal containing compound treatment and wherein the reducing gas used in the cotreatment is in addition to any reducing gas which may be produced from the metal containing compound treatment.

2. The process of claim 1 wherein the gas is selected from the group consisting of hydrogen, carbon monoxide, ammonia, and lower hydrocarbons in the range of about $C_1$ to $C_8$.

3. The process of claim 2 wherein the lower hydrocarbon gas in the range of about $C_1$ to $C_8$ are selected from the group consisting of methane, ethane, ethylene, propane, propylene, butane and butylene.

4. The process of claim 1 wherein the metal containing compound and gas cotreatment is conducted at a temperature within a range of 125° C. less than the general decomposition temperature of the metal containing compound in a specific system for the ore being treated.

5. The process of claim 1 wherein the metal containing compound is employed in an amount of from about 0.1 to 100 kilograms per metric ton of ore.

6. The process of claim 1 wherein the gas is employed at a rate of at least about 1 percent of the reactor atmosphere.

7. In a process for the beneficiation of a metal sulfide ore from gangue, excluding coal, wherein the ore is treated with a metal containing compound under conditions which cause the metal containing compound to react substantially at the surface of the metal sulfide particles to the substantial exclusion of the gangue particles so as to alter the surface characteristics of the metal sulfide values thereby causing a selective enhancement of the magnetic susceptibility of one or more metal sulfide values contained in the ore to the exclusion of the gangue in order to permit a physical separation between the metal sulfide values and the gangue in improvement for the ore in a specific system comprising:

cotreating the ore with a reducing gas at a rate of at least about 1 percent of the reactor atmosphere and from about 0.1 to about 100 kilograms of a metal containing compound per metric ton of ore at a temperature within a range of 125° C. less than the general decomposition temperature of the metal containing compound in the specific system for the ore being treated for a period of time from about 0.05 to about 4 hours and wherein the reducing gas used in the cotreatment is in addition to any reducing gas which may be produced from the metal containing compound treatment.

8. The process of claim 1 or claim 7 wherein the metal containing compound is an iron containing compound.

9. The process of claim 8 wherein the iron containing compound is selected from the group consisting of ferrous chloride, ferric chloride, ferrocene, ferrocene derivatives, ferric acetylacetonate and ferric acetylacetonate derivatives.

10. The process of claim 1 or claim 7 wherein the metal containing compound is a carbonyl.

11. The process of claim 10 wherein the carbonyl is selected from the group consisting or iron, cobalt and nickel.

12. The process of claim 11 wherein the iron carbonyl comprises iron pentacarbonyl.

13. The process of claim 9 wherein the gas is employed at a rate of at least about 10 percent of the reactor atmosphere; the metal containing compound is employed in an amount of from about 1 to about 50 kilograms per metric ton of ore and the cotreatment process is carried out at a temperature within a range of 50° C. less than the general decomposition temperature of the metal containing compound in a specific system for the ore being treated for a period of time from about 0.15 to about 2 hours.

14. The process of claim 13 wherein the gas is employed at a rate of about 100 percent of the reactor atmosphere and the metal containing compound is employed in an amount of from about 2 to about 20 kilograms per metric ton of ore.

15. The process of claim 14 wherein the metal containing compound is iron carbonyl and the cotreatment process is carried out at a temperature within a range of 15° C. less than the general decomposition temperature of the iron carbonyl in the specific system for the ore being treated.

16. The process of claim 1 or claim 7 wherein the ore is treated with ferrocene and a reducing gas selected from the group consisting of hydrogen, carbon monoxide, ammonia, methane and ethylene.

17. The process of claim 1 or claim 7 wherein the ore is treated with ferric acetylacetonate and a reducing gas selected from the group consisting of hydrogen, carbon monoxide, ammonia, methane and ethylene.

18. The process of claim 1 or claim 7 wherein the ore is treated with an iron carbonyl and a reducing gas selected from the group consisting of hydrogen, carbon monoxide, ammonia, methane and ethylene.

19. The process of claim 1 or claim 7 in which the feed ore has been preconcentrated by a separation technique.

20. The process of claim 1 or claim 7 in which the ore is first subjected to a magnetic separation and the resulting non-magnetic fraction comprises the feed ore.

21. The process of claim 1 or claim 7 wherein the mineral values are physically separated from the gangue by a magnetic separation process.

22. The process of claim 21 wherein the magnetic separation process is a wet magnetic separation process.

23. The process of claim 1 or claim 7 wherein the mineral values are physically separated from the gangue by an electrostatic technique.

24. In a process for the beneficiation of a metal sulfide ore from gangue, excluding coal, selected from the group consisting of galena, molybdenite, sphalerite, bornite, cinnabar, arsenopyrite, smaltite, chalcocite, chalcopyrite, orpiment, realgar, pentlandite, stibnite and tetrahedrite wherein the ore is treated with an iron containing compound under conditions which cause the iron containing compound to react substantially at the surface of the metal sulfide particles to the substantial exclusion of the gangue particles so as to alter the surface characteristics of the metal sulfide values thereby causing a selective enhancement of the magnetic susceptibility of one or more metal sulfide values contained in the ore to the exclusion of the gangue in order to permit a magnetic separation between the metal sulfide values and the gangue, the improvement for an ore in a specific system comprising:

cotreating the ore with a reducing gas at a rate of about 100 percent of the reactor atmosphere and from about 2 to about 20 kilograms of an iron containing compound per metric ton of ore at a temperature within a range of 125° C. less than the general decomposition temperature of the iron containing compound in a specific system for the ore being treated and wherein the reducing gas used in the cotreatment is in addition to any reducing gas which may be produced from the metal containing compound treatment.

25. The process of claim 24 wherein the metal sulfide ore is cotreated with a reducing gas selected from the group consisting of hydrogen, carbon monoxide, ammonia, methane and ethylene and an iron containing compound selected from the group consisting of iron pentacarbonyl, ferrous chloride, ferric chloride, ferrocene and ferric acetylacetonate for a time period of from about 0.15 to about 2 hours.

26. The process of claim 25 wherein the iron containing compound is iron pentacarbonyl and the cotreatment is conducted at a temperature within a range of 15° C. less than the general decomposition temperature of the iron pentacarbonyl in a specific system for the ore being treated.

27. The process of claim 26 wherein the metal sulfide ore is galena.

28. The process of claim 26 wherein the metal sulfide ore is molybdenite.

29. The process of claim 26 wherein the metal sulfide ore is sphalerite.

30. The process of claim 25 wherein the reducing gas employed is selected from the group consisting of hydrogen and carbon monoxide and the iron containing compound employed is ferrocene.

31. The process of claim 30 wherein the metal sulfide ore is galena.

32. The process of claim 30 wherein the metal sulfide ore is molybdenite.

33. The process of claim 30 wherein the metal sulfide ore is sphalerite.

34. The process of claim 25 wherein the reducing gas employed is selected from the group consisting of hydrogen and carbon monoxide and the iron containing compound is ferric acetylacetonate.

35. The process of claim 34 wherein the metal sulfide ore is galena.

36. The process of claim 34 wherein the metal sulfide ore is molybdenite.

37. The process of claim 34 wherein the metal sulfide ore is sphalerite.

38. The process of claim 25 wherein the reducing gas is hydrogen and the iron containing compound is ferrous chloride and the cotreatment is conducted at a temperature within a range of 50° C. less than the general decomposition temperature of the ferrous chloride in a specific system for the ore being treated.

39. The process of claim 38 wherein the metal sulfide ore is galena.

40. The process of claim 38 wherein the metal sulfide ore is molybdenite.

41. The process of claim 38 wherein the metal sulfide ore is sphalerite.

42. The process of claim 25 wherein the reducing gas is hydrogen and the iron containing compound is ferric chloride and the cotreatment is conducted at a temperature within a range of 50° C. less than the general decomposition temperature of the ferric chloride in a specific system for the ore being treated.

43. The process of claim 42 wherein the metal sulfide ore is galena.

44. The process of claim 26 wherein the metal sulfide ore is bornite.

45. The process of claim 26 wherein the metal sulfide ore is cinnabar.

46. The process of claim 26 wherein the metal sulfide ore is arsenopyrite.

47. The process of claim 26 wherein the metal sulfide ore is smaltite.

48. The process of claim 26 wherein the metal sulfide ore is chalcocite.

49. The process of claim 26 wherein the metal sulfide ore is chalcopyrite.

50. The process of claim 26 wherein the metal sulfide ore is orpiment.

51. The process of claim 26 wherein the metal sulfide ore is realgar.

52. The process of claim 26 wherein the metal sulfide ore is pentalandite.

53. The process of claim 26 wherein the metal sulfide ore is stibnite.

54. The process of claim 26 wherein the metal sulfide ore is tetrahedrite.

55. The process of claim 10 wherein the gas is employed at a rate of at least about 10 percent of the reactor atmosphere; the carbonyl is employed in an amount of from about 1 to about 50 kilograms per metric ton of ore and the cotreatment process is carried out a temperature within a range of 50° C. less than the general decomposition temperature of the carbonyl in a specific system for the ore being treated for a period of time from about 0.15 to about 2 hours.

56. The process of claim 55 wherein the gas is employed at a rate of about 100 percent of the reactor atmosphere and the carbonyl is employed in an amount of from about 2 to about 20 kilograms per metric ton of ore.

57. The process of claim 56 wherein the carbonyl is iron carbonyl and the cotreatment process is carried out at a temperature within a range of 15° C. less than the general decomposition temperature of the iron carbonyl in the specific system for the ore being treated.

* * * * *